(12) United States Patent
Wang

(10) Patent No.: US 12,737,129 B2
(45) Date of Patent: Sep. 15, 2026

(54) NON-VOLATILE MEMORY CONTROLLER AND METHOD FOR CONTROLLING A NON-VOLATILE MEMORY

(71) Applicant: Silicon Motion, Inc., Jhubei City (TW)

(72) Inventor: Ting-Hsing Wang, Zhubei City (TW)

(73) Assignee: SILICON MOTION, INC., Jhubei City (TW)

( * ) Notice: Subject to any disclaimer, the term of this patent is extended or adjusted under 35 U.S.C. 154(b) by 0 days.

(21) Appl. No.: 19/172,981

(22) Filed: Apr. 8, 2025

(65) Prior Publication Data

US 2026/0029928 A1 Jan. 29, 2026

(30) Foreign Application Priority Data

Jul. 23, 2024 (TW) ................................ 113127486

(51) Int. Cl.
*G06F 3/06* (2006.01)

(52) U.S. Cl.
CPC .......... *G06F 3/0619* (2013.01); *G06F 3/0604* (2013.01); *G06F 3/0659* (2013.01); *G06F 3/0679* (2013.01)

(58) Field of Classification Search
None
See application file for complete search history.

(56) References Cited

U.S. PATENT DOCUMENTS

| | | | | |
|---|---|---|---|---|
| 2014/0156913 | A1 | 6/2014 | Chiang | |
| 2016/0070474 | A1 | 3/2016 | Yu | |
| 2018/0225050 | A1 | 8/2018 | Suzuki | |
| 2022/0091772 | A1 | 3/2022 | Fujisawa | |
| 2025/0372179 | A1* | 12/2025 | Zhou | G11C 16/26 |

* cited by examiner

*Primary Examiner* — Brian R Peugh
(74) *Attorney, Agent, or Firm* — McClure, Qualey & Rodack, LLP

(57) ABSTRACT

A reliability control technology for non-volatile memory is shown. A non-volatile memory has a plurality of blocks. For each block, the processor records a time stamp about programming of at least one page in the block. The processor performs a reliability check on the target block that corresponds to a time stamp exceeding a critical time limit and, if the reliability check shows that the target block does not meet a reliability standard, the processor moves data from the target block to a spare space for safe migration.

18 Claims, 4 Drawing Sheets

NON-VOLATILE MEMORY CONTROLLER AND METHOD FOR CONTROLLING A NON-VOLATILE MEMORY

CROSS REFERENCE TO RELATED APPLICATIONS

This application claims priority of Taiwan Patent Application No. 133127486, filed on Jul. 23, 2024, the entirety of which is incorporated by reference herein.

BACKGROUND OF THE INVENTION

Field of the Invention

The present invention relates to control technology for a non-volatile memory.

Description of the Related Art

There are various forms of non-volatile memory used for long-term data storage, such as flash memory, magnetoresistive random access memory (magnetoresistive RAM), ferroelectric RAM, resistive RAM, spin transfer torque-RAM (STT-RAM), and so on. These types of non-volatile memory may be used as the storage medium in a data storage device.

The aforementioned storage media may mutate over a period of time, and the stored data becomes less and less reliable as it ages. How to efficiently control a non-volatile memory with reliable data retention is an important issue in the technical field.

BRIEF SUMMARY OF THE INVENTION

A non-volatile memory control technology is proposed in the disclosure, which guarantees the data retention of the non-volatile memory.

A non-volatile memory controller in accordance with an exemplary embodiment of the disclosure a communication interface and a processor. The communication interface is coupled to a non-volatile memory that includes a plurality of blocks. The processor executes program code to access the non-volatile memory through the communication interface. For each block, the processor records a time stamp about programming of at least one page in the block. The processor performs a reliability check on the target block that corresponds to a time stamp exceeding a critical time limit. If the reliability check shows that the target block does not meet a reliability standard, the processor moves data from the target block to a spare space.

In an exemplary embodiment, the critical time limit depends on the erase count of the corresponding block. Or, the critical time limit is adaptive to the storage type of the corresponding block. In an exemplary embodiment, the storage type may be a triple level cell (TLC) storage type, or a single level cell (SLC) storage type.

In an exemplary embodiment, the processor applies an error correction code (ECC) technology to implement a reliability check performed on the target block.

In an exemplary embodiment, the processor manages a scan queue to record a block with a time stamp exceeding the critical time limit, and obtains the target block for the reliability check based on the scan queue.

In an exemplary embodiment, the scan queue is limited to record the block of just one block. In response to the scan queue not being empty, the processor reads the scan queue to obtain the target block, and performs a reliability check on the target block. In response to a time stamp of an active block exceeding the critical time limit while the scan queue is empty, the processor performs a reliability check on the active block and, if the reliability check shows that the active block does not meet the reliability standard, the processor moves data from the active block to a spare space. In this case, the processor further checks a link list that shows the closing order of data blocks, to obtain a target data block according to the closing order shown in the link list, and, if a time stamp of the target data block exceeds the critical time limit, the processor updates the scan queue to record the target data block.

When the scan queue is empty and a time stamp of an active block does not exceed the critical time limit, the processor checks a link list that shows the closing order of data blocks, to obtain a target data block according to the closing order shown in the link list, and, if a time stamp of the target data block exceeds the critical time limit, the processor updates the scan queue to record the target data block. Later, the processor triggered again finds that the scan queue is not empty, and regards the block recorded in the scan queue as the target block to perform a reliability check on the target block. Accordingly, data migration may be performed based on a result of the reliability check.

In an exemplary embodiment, the processor performs a reliability check on the target block by checking at least one special-attention page in the target block.

In an exemplary embodiment, the processor dynamically updates the time stamp of each block on a volatile memory, and then seals the time stamps of the different blocks from the volatile memory to the non-volatile memory to form a time stamp table in the non-volatile memory, wherein the time stamp table is stored in a system block of the non-volatile memory. When being started up, the processor first performs reliability check and data migration, based on a result of the reliability check, on the special-attention pages of each block of the non-volatile memory, and then loads the time tag table from the system block to the volatile memory for dynamical update.

The aforementioned technology is further implemented as a non-volatile memory control method.

In an exemplary embodiment, the non-volatile memory control method is further coded as a computer program product.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description enumerates various embodiments of the disclosure, but is not intended to be limited thereto. The actual scope of the disclosure should be defined according to the claims. The various functional blocks mentioned below may be implemented by a combination of hardware, software, and firmware, and may also involve circuit implementation. The various functional blocks are not limited to being implemented separately, but can also be combined together to share certain functions.

A non-volatile memory for long-term data retention may be a flash memory, a magnetoresistive random access memory (magnetoresistive RAM), a ferroelectric RAM, a resistive RAM, a spin transfer torque-RAM (STT-RAM) and so on. The following discussion uses flash memory as an example, but is not limited thereto. The proposed technology may be applied to the other types of non-volatile memory.

Today's data storage devices often use flash memory as the storage medium, to implement memory cards, universal serial bus (USB) flash devices, solid-state drives (SSDs), Universal Flash Storage (UFS) devices, and so on. In another exemplary embodiment, a flash memory may be packaged with a controller to form a multiple-chip package called eMMC (embedded multimedia card).

A data storage device using a flash memory as a storage medium may be applied in a variety of electronic devices, including a smartphone, a wearable device, a tablet computer, a virtual reality device, etc. A processor of an electronic device may be regarded as a host that operates the data storage device equipped on the electronic device. Through a controller within the data storage device, the host accesses the flash memory which is the storage medium within the data storage device.

A data center may be built with data storage devices using flash memories as the storage medium. For example, a server may operate an array of SSDs to form a data center. The server may be regarded as a host that operates the SSDs. Through the controllers of the SSDs, the server accesses the flash memories which are storage medium within the SSDs.

A vehicle-mounted device may also use a flash memory for data storage. Various sensors in the vehicle system are regarded as the host end, which has the need to access the data storage device equipped on the vehicle-mounted device.

A flash memory has its special storage characteristics. The host indicates a logical address (for example, a logical block address LBA or a global host page number GHP, etc.) to issue read or write requests to the flash memory. The logical address needs to be mapped to a physical address indicating a physical space of the flash memory.

Figure 1:
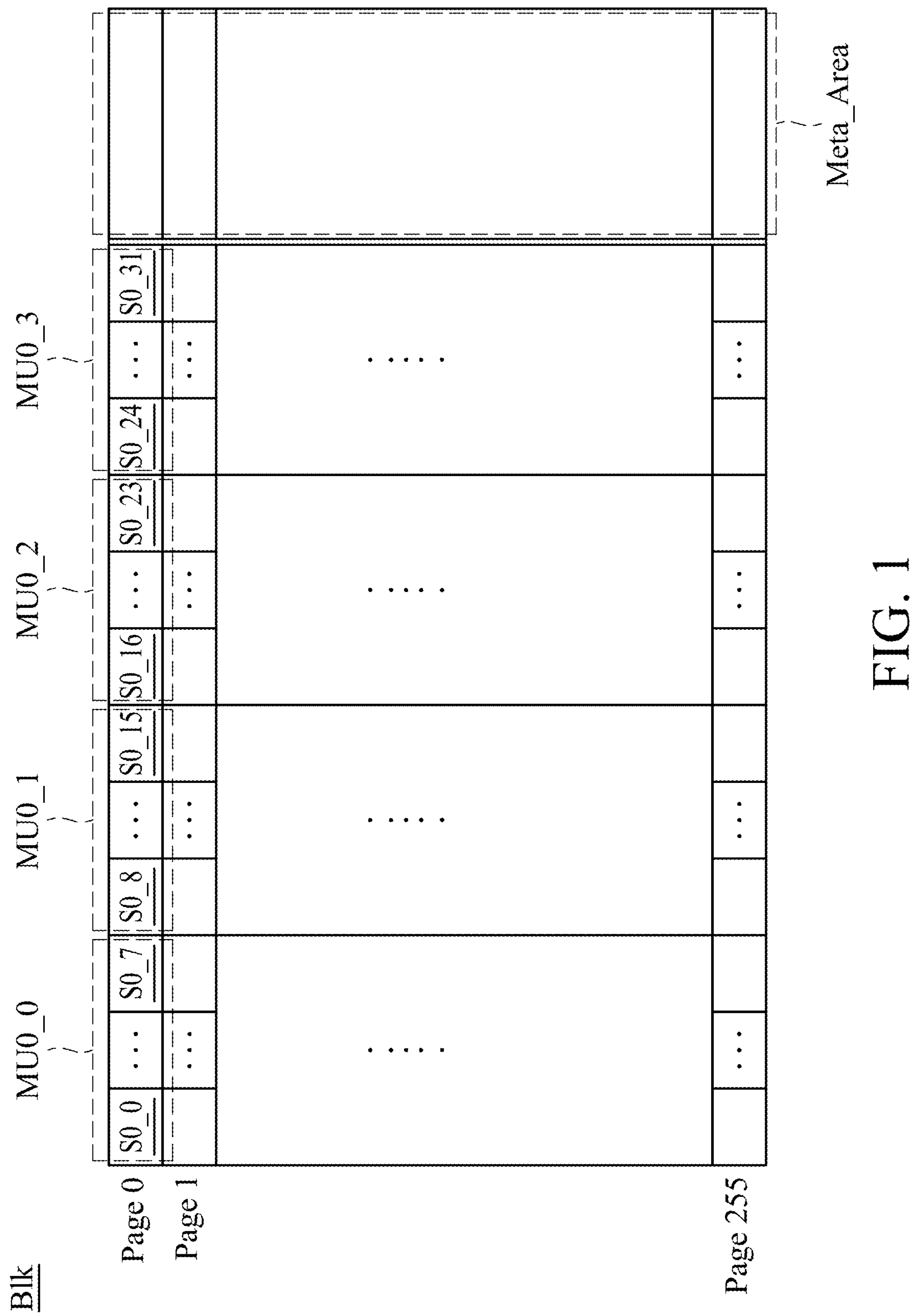
FIG. 1 illustrates the physical structure of one block (Blk) of a flash memory.

The physical space of a flash memory is divided into a plurality of blocks for data storage. FIG. 1 illustrates the physical structure of one block (Blk) of a flash memory. A block Blk includes a plurality of pages; for example, page 0 . . . page 255. Each page includes a plurality of sectors; for example, page 0 includes 32 sectors S0_0 . . . . S0_31. Each sector may store 512B of user data, so that one page can provide a storage space of 16 KB. Every four sectors may be managed together, referring to the management units MU0_0/MU0_1/MU0_2/MU0_3 shown in the figure. The block Blk further includes a meta data area Meta_Area, which is composed of the tail space of each page and is operative to store meta data.

In an exemplary embodiment, the storage space of each block Blk is programmed in order of the page number, e.g., from the low number (page 0) to the high number (page 255). In some exemplary embodiments, a multi-channel technology is applied to greatly improve the data throughput. The blocks accessed in parallel through the different channels form a super block. The pages of the same page number in the different blocks of a super block form a super page. According to the multi-channel technology, the storage space of a super block may be programmed according to the super page number from low to high. The term, block, referred to in some exemplary embodiments of the disclosure means the super block. It is not intend to limit the size of the blocks, pages, and sectors. The following description based on a storage device of a specific size is for convenience of discussion only.

The flash memory further includes a special characteristic. The storage space must be erased in units of blocks before being reused. To update data of a specific logical address, the new data is programmed into a spare area rather than being overwritten on the storage space of the old data. After the data update, the old data is invalidated. The scattered valid data must to be collected and moved to a spare space by garbage collection. After the garbage collection, the blocks with only invalid data retained therein are erased and then reallocated as active blocks to cope with the subsequent write requests from the host. Once an active block is full, the end-of-block (EoB) information is programmed into the final page 255 of the block Blk to close the active block and make it a data block. The closing behavior may be record at the end of a link list (hereinafter labeled as LinkList). The link list LinkList shows the closing order of the data blocks.

However, the data retention capability of a flash memory may decay over time, and the stored contents may mutate. In this disclosure, the programming of at least one page of each block is marked by a time stamp. The time stamp is recorded for recognition of a target block that is an unreliable old block. A reliability check is therefore performed on the target block. When the reliability of the target block does not meet a critical standard, the data of the target block is moved to a spare space for safe migration.

Figure 2:
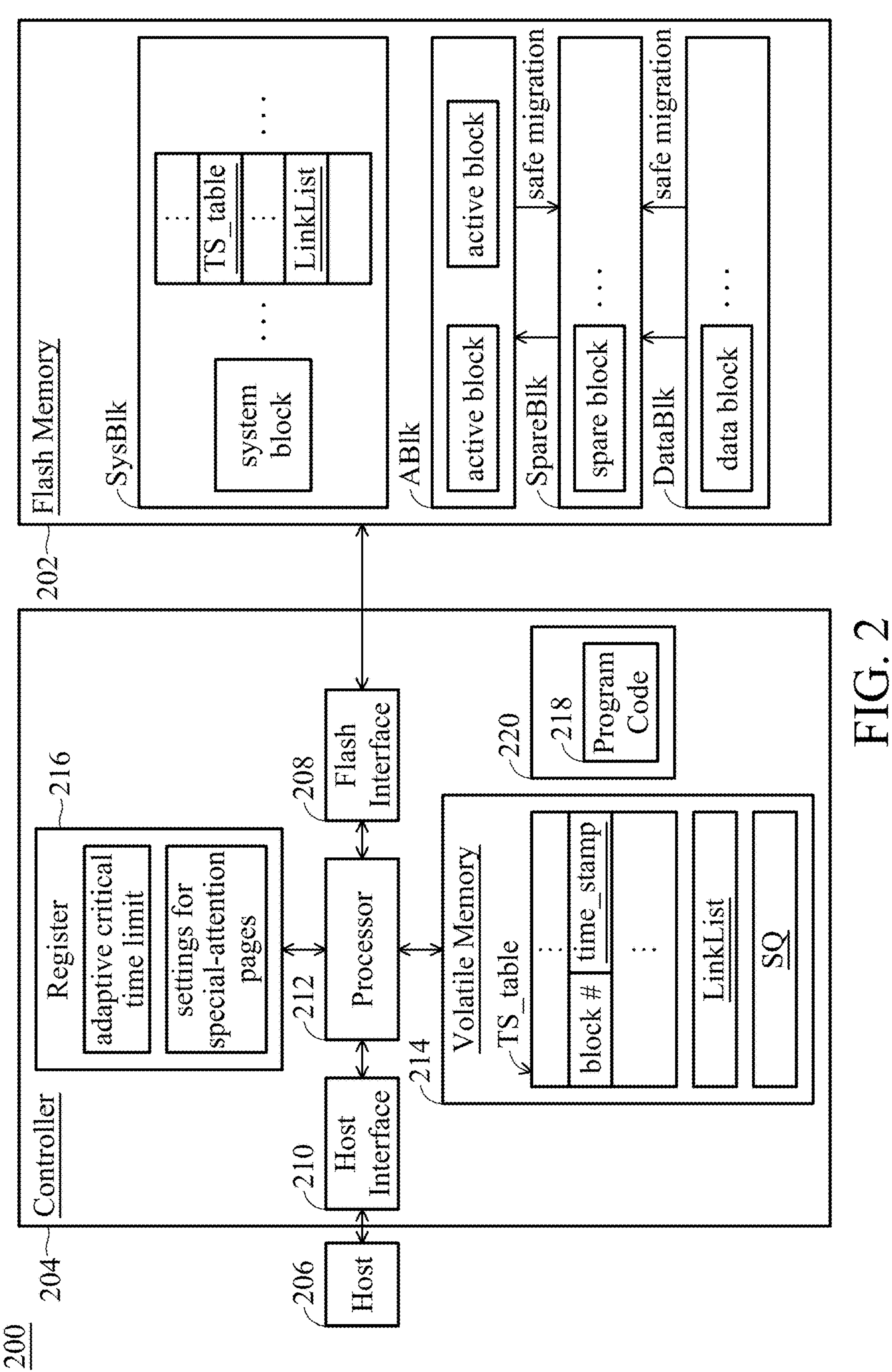
FIG. 2 illustrates an electronic system 200 in accordance with an exemplary embodiment of the disclosure, which includes a flash memory 202, a (non-volatile memory) controller 204, and a host 206.

FIG. 2 illustrates an electronic system 200 in accordance with an exemplary embodiment of the disclosure, which includes a flash memory 202, a (non-volatile memory) controller 204, and a host 206. The controller 204 includes a flash interface 208 coupled to the flash memory 202, a host interface 210 coupled to the host 206, and a processor 212. In response to a request from the host 206, the processor 212 operates to access the flash memory 202 through the flash interface 208. The flash memory interface 208 is paired with the flash memory 202. For another type of storage medium, the flash memory interface 208 is replaced by its corresponding communication interface. The flash memory interface 208 and the flash memory 202 may communicate with each other according to a double data rate (DDR) communication protocol, such as Open NAND Flash Interface (ONFI), DDR Toggle, or other communication protocols. The controller 204 may communicate with the host 206 through the host interface 210 using a proper communication protocol such as a Universal Serial Bus (USB) protocol, an advanced technology attachment (ATA) protocol, a serial advanced technology attachment (SATA) protocol, a peripheral component interconnect express (PCI-E) protocol, a Universal Flash Storage (UFS) protocol, an embedded MultiMedia Card (eMMC) protocol, and so on.

The flash memory 202 may include a system block pool SysBlk, a data block pool DataBlk, a spare block pool SpareBlk, and an active block pool ABlk. In the disclosure, the time stamp of each block may be stored in the system block pool SysBlk for non-volatile storage. User data is stored in the data block pool DataBlk. The spare block pool SpareBlk does not include valid data. Thus, blocks can be selected from the spare block pool SpareBlk to be erased and pushed into the active block pool ABlk as active blocks. The active blocks may be used to receive write data from the host 206 or receive valid data collected from garbage collection (GC).

As shown in the figure, the controller 204 may further include a volatile memory (DRAM or SRAM) 214. With the use of the active blocks, the processor 212 programs the volatile memory 214 to record the time stamp (time_stamp) about the programming of at least one page, such as a starting page, in each block. In accordance with an exemplary embodiment of the disclosure, a time stamp table TS_table is proposed to list the time stamps (time_stamp) of the different blocks. In response to any time stamp time_stamp exceeding a critical time limit, a target block is obtained, which may be an active block or a data block. The processor 212 performs a reliability check on the target block. When the reliability of the target block does not meet a critical standard, the data of the target block is moved to a spare space (e.g., one spare block selected from the spare block pool SpareBlk) for safe migration.

As shown in the figure, the processor 212 may dynamically update the link list LinkList in the volatile memory 214 to show the closing order of the data blocks of the flash memory 202. According to the link list LinkList, the processor 212 checks the time stamps time_stamp of the data blocks in their EoB programming order. In particular, between the time stamp checking of the different data blocks, the processor 212 may insert the time stamp checking of active blocks. Based on the time stamp checking, the processor 212 performs reliability checks on the old blocks. Based on the results of the reliability checks, the processor 212 performs safety migration of unreliable blocks. This solution not only ensures the reliability of the closed data blocks (blocks with EoB information), but also improves the reliability of non-closed active blocks (whose EoB information has not been programmed therein yet).

The reliability check may be performed based on an error correction code (ECC) technology. According to the ECC technology, the blocks with correctable errors are timely obtained, and safely copied to a spare space before the errors become irreparable.

The critical time limit may be adaptively modified according to the status of the flash memory 202. In an exemplary embodiment, the critical time limit depends on the erase count of the checked block. For example, the different levels of erase counts correspond to the different critical time limits. The higher the erase count is, the shorter the critical time limit is. Thus, a reliability check can be performed before the irreparable error really happens and, according to the reliability check, safe migration (data migration based on a result of the reliability check) can be timely performed on the dangerous blocks. In an exemplary embodiment, the critical time limit for a triple-level cell (TLC) block is different from the critical time limit for a single-level cell (SLC) block. For example, the critical time limit for a TLC block is shorter than the critical time limit for an SLC block, which results in a timely reliability check. The safe migration that may be required after the reliability check can therefore be performed prior to the irreparable error really happens.

In an exemplary embodiment, the processor 212 performs a reliability check on only a part of the target block, e.g., only some special-attention pages of the target block are checked. The special pages may be the first five pages of the target block.

In the illustrated example, the processor 212 is equipped with a register 216 for the designer to fill in the adaptive critical time limit (for example, a table is loaded in the register 216 to show the critical time limits corresponding to the different erase count levels), and the page numbers indicating the special-attention pages. In this way, the different areas in the flash memory 202 may correspond to the different critical time limits due to their different statuses. The designer can also make customized selection of the special-attention pages in the target block, to implement a partial reliability check of the target block.

The non-volatile memory control method implemented by the processor 212 based on the aforementioned concept also falls within the protection scope of the disclosure. The processor 212 executes the program code 218 to implement the non-volatile memory control method of the disclosure. The program code 218 may be packaged into a computer program product to be loaded into the memory 220 and executed by the processor 212.

In an exemplary embodiment, the execution of the reliability check is only performed in some special rules, and thereby the execution of the safe migration performed based on the results of the reliability check is performed in a limited way. The time-consuming safe migration, therefore, will not be performed on several blocks at one time. Between the safe migration of the different blocks, the controller 204 can still fluently handle the access requests that the host 206 issues to the flash memory 202. As shown in the figure, a scan queue SQ is updated on the volatile memory 214 to record the data blocks whose time stamps (time_stamp) exceed the critical time limit. Due to the limited depth of the scan queue SQ, the execution of a reliability check and the safe migration performed based on the results of the reliability check are reasonably executed without taking too much time.

In an exemplary embodiment, just one block can be recorded in the scan queue SQ, which is explained in the following.

Figure 3:
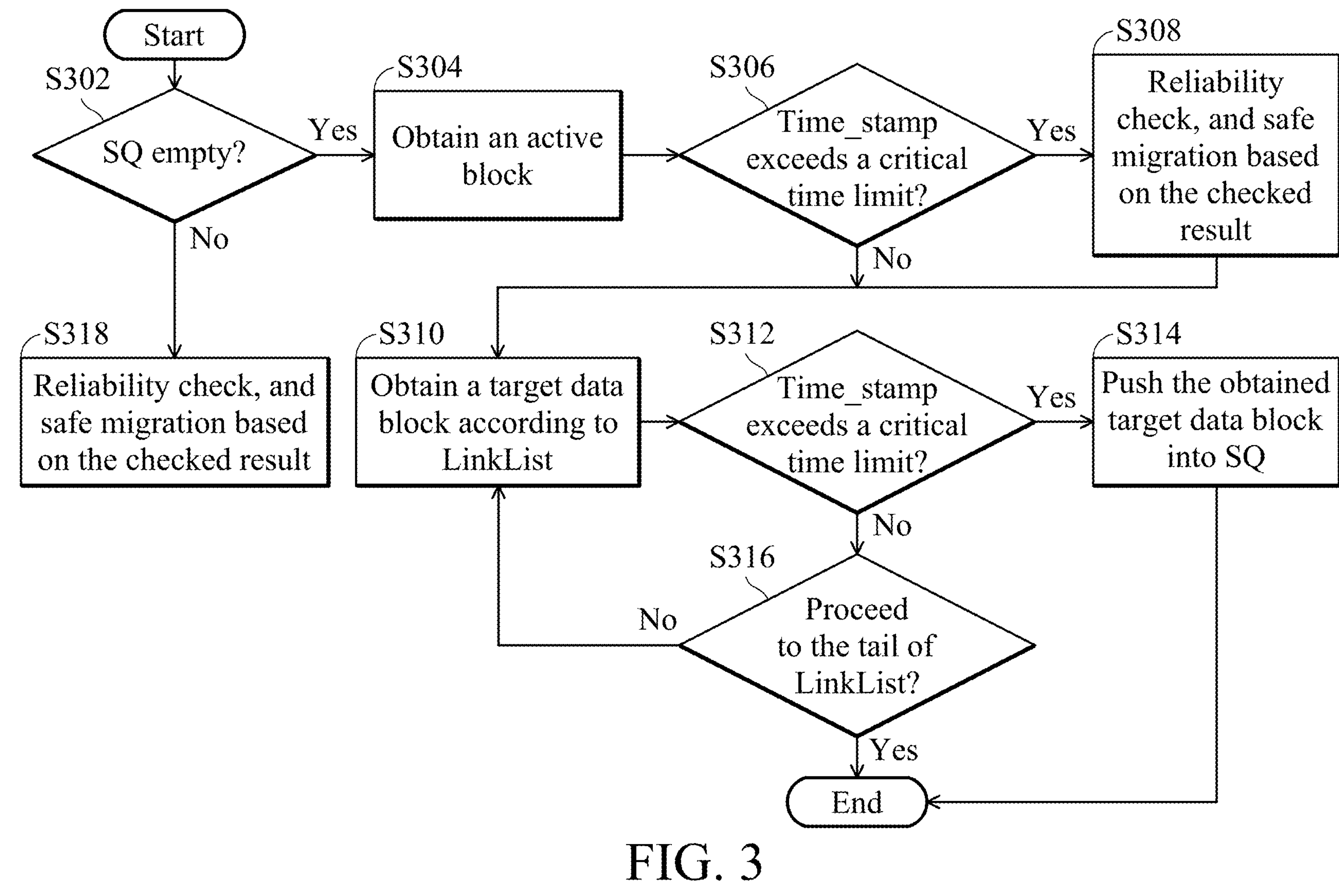
FIG. 3 is a flowchart illustrating the operations of the processor 212 which is triggered to perform the time stamp (time_stamp) checking.

FIG. 3 is a flowchart illustrating the operations of the processor 212 which is triggered to perform the time stamp (time_stamp) checking. After being triggered, the processor 212 performs step S302 to check whether the scan queue SQ is empty. If the scan queue SQ is empty, the processor 212 obtains an active block (step S304) whose EOB information has not been programmed therein yet, and determines whether the time stamp (time_stamp) of the active block exceeds a critical time limit (step S306). If yes, the processor 212 performs a reliability check on the active block in step S308. If the reliability of the active block does not meet a critical standard, the data of the active block is moved to a spare space for safe migration.

In the illustrated exemplary embodiment, if it is determined in step S306 that the time stamp of the active block does not exceed the critical time limit, or it is determined that step S308 is completed, the processor 212 performs step S310 to obtain a target data block according to the link list LinkList that shows the closing order of all data blocks. In step S312, the processor 212 determines whether the time stamp (time_stamp) of the obtained target data block exceeds the critical time limit. If so, the processor 212 pushes the obtained target data block into the scan queue SQ in step S314, and the procedure illustrated in FIG. 3 ends.

If it is determined in step S312 that the time stamp of the obtained target data block has not exceeded the critical time limit, the processor 212 performs step S316 to determine whether the obtained target data block is at the tail of the link list LinkList. If so, the procedure illustrated in FIG. 3 ends. Otherwise, the processor 212 performs step S310 again, to obtain the next target data block according to the link list LinkList to perform the time stamp checking (S312) on the new target.

If it is determined in step S302 that the scan queue SQ is not empty, the processor 212 performs step S318, to check the reliability of the data blocks record in the scan queue SQ, and perform safe migration on the data block that does not pass the reliability check.

Figure 4:
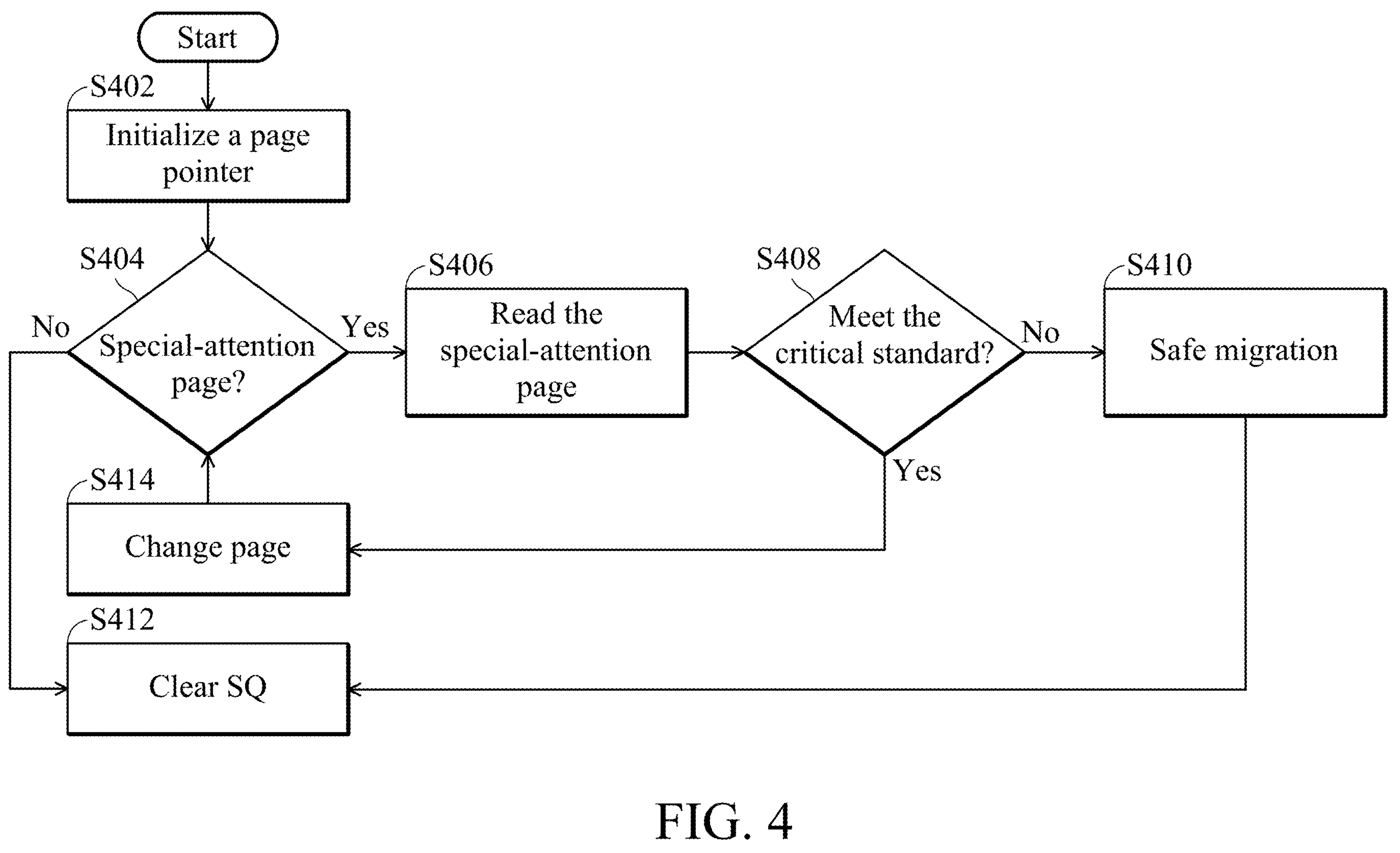
FIG. 4 is a flow chart illustrating the details of the reliability check and safe migration (data migration based on a result of the reliability check) in accordance with an exemplary embodiment of the disclosure.

FIG. 4 is a flow chart illustrating the details of the reliability check and safe migration (data migration based on a result of the reliability check) in accordance with an exemplary embodiment of the disclosure, which relates to step S308 (in which an active block is regarded as the target block), or step S318 (in which a data block indicated in the scan queue SQ is regarded as the target block).

The processor 212 first initializes a page pointer in step S402, and then determines in step S404 whether the page pointer points to a special-attention page that is predetermined by the designer. If so, the processor 212 reads the special-attention page in step S406, and determines in step S408 whether the read page meets a critical standard (e.g., determined based on an ECC technology). If the read page does not meet the critical standard, the processor 212 performs safety migration of the entire target block in step S410. For example, the target block is completely moved to a spare block. Next, the processor 212 clears the scan queue SQ in step S412. In this design, the capacity depth of the scan queue SQ is just for storing one block number. The size of the scan queue SQ does not need to be too large.

If step S408 shows that the data quality at the location pointed to by the page pointer meets the critical standard (e.g., the data passes the verification of the ECC technology), the processor 212 changes the page pointer in step S414 to check the other pages of the target block until all the special-attention pages of the target block are checked.

In an exemplary embodiment, the procedure of FIG. 3 is triggered in the background operation of the device (e.g., when the controller 204 does not need to respond to any requests from the host 206). In an exemplary embodiment, the procedure of FIG. 3 is triggered on a regular basis. For example, the scan queue SQ may be checked once every second (step S302). According to the flow charts of FIG. 3 and FIG. 4, the safe migration of the different blocks will not be continuously performed. The controller 204 can be easily switched back to handle the access requests that the host 206 issues to the flash memory 202.

For a device that has been unused for a long time, a solution is also proposed in the disclosure.

In an exemplary embodiment, the processor 212 not only dynamically updates the time stamp time_stamp of each block in the volatile memory 214, but also stores it in the flash memory 202 to form a time stamp table TS_table. The time stamp table TS_table may be stored in a system block (SysBlk) of the flash memory 202. When being started up, the processor 212 first performs a reliability check on the special-attention pages of all blocks of the flash memory 202. Thus, the safe migration of the mutated blocks is properly performed even though the device has been unused for a long time. Then, the time stamp table TS_table stored in the system block is loaded to the volatile memory 214 for real time management, so as to be used for the regularly performed reliability checks.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A non-volatile memory controller, comprising:

a communication interface, coupled to a non-volatile memory that includes a plurality of blocks; and a processor, executing program code to access the non-volatile memory through the communication interface, wherein:

for each block, the processor records a time stamp to correspond to programming of at least one page in the block; and the processor performs a reliability check on a target block that corresponds to a time stamp exceeding a critical time limit and, if the reliability check shows that the target block does not meet a reliability standard, the processor moves data from the target block to a spare space.

2. The non-volatile memory controller as claimed in claim 1, wherein:

for each block, the critical time limit is determined by an erase count of the block, or a storage type of the block.

3. The non-volatile memory controller as claimed in claim 2, wherein:

the processor applies an error correction code technology to implement the reliability check performed on the target block.

4. The non-volatile memory controller as claimed in claim 1, wherein:

the processor manages a scan queue to record which time-stamped blocks exceed the critical time limit, and obtains the target block for the reliability check based on the scan queue.

5. The non-volatile memory controller as claimed in claim 4, wherein:

in response to the scan queue not being empty, the processor reads the scan queue to obtain the target block, and performs the reliability check on the target block.

6. The non-volatile memory controller as claimed in claim 4, wherein:

in response to a time stamp of an active block exceeding the critical time limit while the scan queue is empty, the processor performs the reliability check on the active block and, if the reliability check shows that the active block does not meet the reliability standard, the processor moves data from the active block to a spare space; and in response to the empty scan queue, the processor checks a link list that shows a closing order of data blocks, to obtain a target data block according to the closing order shown in the link list, and, if a time stamp of the target data block exceeds the critical time limit, the processor updates the scan queue to record the target data block.

7. The non-volatile memory controller as claimed in claim 4, wherein:

when the scan queue is empty and a time stamp of an active block does not exceed the critical time limit, the processor checks a link list that shows a closing order of data blocks, to obtain a target data block according to the closing order shown in the link list, and, if a time stamp of the target data block exceeds the critical time limit, the processor updates the scan queue to record the target data block.

8. The non-volatile memory controller as claimed in claim 1, wherein:

the processor performs the reliability check on the target block by checking at least one special-attention page in the target block.

9. The non-volatile memory controller as claimed in claim 1, wherein:

the processor dynamically updates the time stamp of each block on a volatile memory, and then seals the time stamps of the different blocks from the volatile memory to the non-volatile memory to form a time stamp table in the non-volatile memory, wherein the time stamp table is stored in a system block of the non-volatile memory; and when being started up, the processor performs reliability check and data migration based on a result of the reliability check on special-attention pages of each block of the non-volatile memory, and then loads the time stamp table from the system block to the volatile memory to be further dynamically updated.

10. A method for controlling a non-volatile memory that includes a plurality of blocks, comprising:

for each block, recording a time stamp about programming of at least one page in the block; and performing a reliability check on a target block that corresponds to a time stamp exceeding a critical time limit and, if the reliability check shows that the target block does not meet a reliability standard, moving data from the target block to a spare space.

11. The method as claimed in claim 10, wherein:

for each block, the critical time limit is determined by an erase count of the block, or a storage type of the block.

12. The method as claimed in claim 11, wherein:

an error correction code technology is applied to implement the reliability check performed on the target block.

13. The method as claimed in claim 10, further comprising:

managing a scan queue to record a block with a time stamp exceeding the critical time limit, and obtaining the target block for the reliability check based on the scan queue.

14. The method as claimed in claim 13, further comprising:

in response to the scan queue not being empty, reading the scan queue to obtain the target block, and performing the reliability check on the target block.

15. The method as claimed in claim 14, further comprising:

in response to a time stamp of an active block exceeding the critical time limit while the scan queue is empty, performing the reliability check on the active block and, if the reliability check shows that the active block does not meet the reliability standard, moving data from the active block to a spare space; and in response to the empty scan queue, checking a link list that shows a closing order of data blocks to obtain a target data block according to the closing order shown in the link list and, if a time stamp of the target data block exceeds the critical time limit, updating the scan queue to record the target data block.

16. The method as claimed in claim 13, further comprising:

when the scan queue is empty and a time stamp of an active block does not exceed the critical time limit, checking a link list that shows a closing order of data blocks to obtain a target data block according to the closing order shown in the link list and, if a time stamp of the target data block exceeds the critical time limit, updating the scan queue to record the target data block.

17. The method as claimed in claim 10, further comprising:

performing the reliability check on the target block by checking at least one special-attention page in the target block.

18. The method as claimed in claim 10, further comprising:

dynamically updating the time stamp of each block on a volatile memory, and then sealing the time stamps of the different blocks from the volatile memory to the non-volatile memory to form a time stamp table in the non-volatile memory, wherein the time stamp table is stored in a system block of the non-volatile memory; and when being started up, performing the reliability check and data migration based on a result of the reliability check on special-attention pages of each block of the non-volatile memory, and then loading the time stamp table from the system block to the volatile memory to be further dynamically updated.

* * * * *